United States Patent [19]

Stallbaumer

[11] Patent Number: 5,749,588
[45] Date of Patent: May 12, 1998

[54] COMPOSITE HAND TRUCK

[75] Inventor: John J. Stallbaumer, Wichita, Kans.

[73] Assignee: Harper Trucks, Inc., Wichita, Kans.

[21] Appl. No.: 681,825

[22] Filed: Jul. 29, 1996

[51] Int. Cl.⁶ .................................................. B62B 1/02
[52] U.S. Cl. .................................. 280/47.27; 280/47.17; 280/47.24
[58] Field of Search ............................. 280/47.27, 47.28, 280/47.29, 47.17, 47.24, 47.31, 47.26, 655, 655.1, 653, 652

[56] References Cited

U.S. PATENT DOCUMENTS

| | | | |
|---|---|---|---|
| 2,263,879 | 11/1941 | Jorgensen | 280/5.24 |
| 3,046,035 | 7/1962 | Nichols | 280/47.27 |
| 4,452,468 | 6/1984 | Eads et al. | |
| 4,540,196 | 9/1985 | Paping et al. | 280/652 |
| 4,563,014 | 1/1986 | Mortenson | 280/47.18 |
| 4,591,183 | 5/1986 | Gordon et al. | |
| 4,679,817 | 7/1987 | Schufer | 280/47.27 |
| 4,869,526 | 9/1989 | Blake | 280/47.27 |
| 5,040,808 | 8/1991 | McIntyre | 280/47.26 |

FOREIGN PATENT DOCUMENTS

| | | | |
|---|---|---|---|
| 998054 | 1/1952 | France | 280/47.27 |
| 655696 | 5/1986 | Sweden | 280/47.17 |

OTHER PUBLICATIONS

Harper (Catalog) No. 190, 1990 (49 pages).
Expresso (Catalog) No. 3202 (6 pages).

*Primary Examiner*—Eric D. Culbreth
*Attorney, Agent, or Firm*—Edward L. Brown, Jr.

[57] ABSTRACT

A two-wheeled hand truck comprising a pair of side frames molded from highstrength plastic formed in an open truss with compression and tensile members. The side frames are held in a rigid parallel relationship to each other by cross rails, handles and a toe plate with integral stiffeners attached to the side frames.

8 Claims, 2 Drawing Sheets

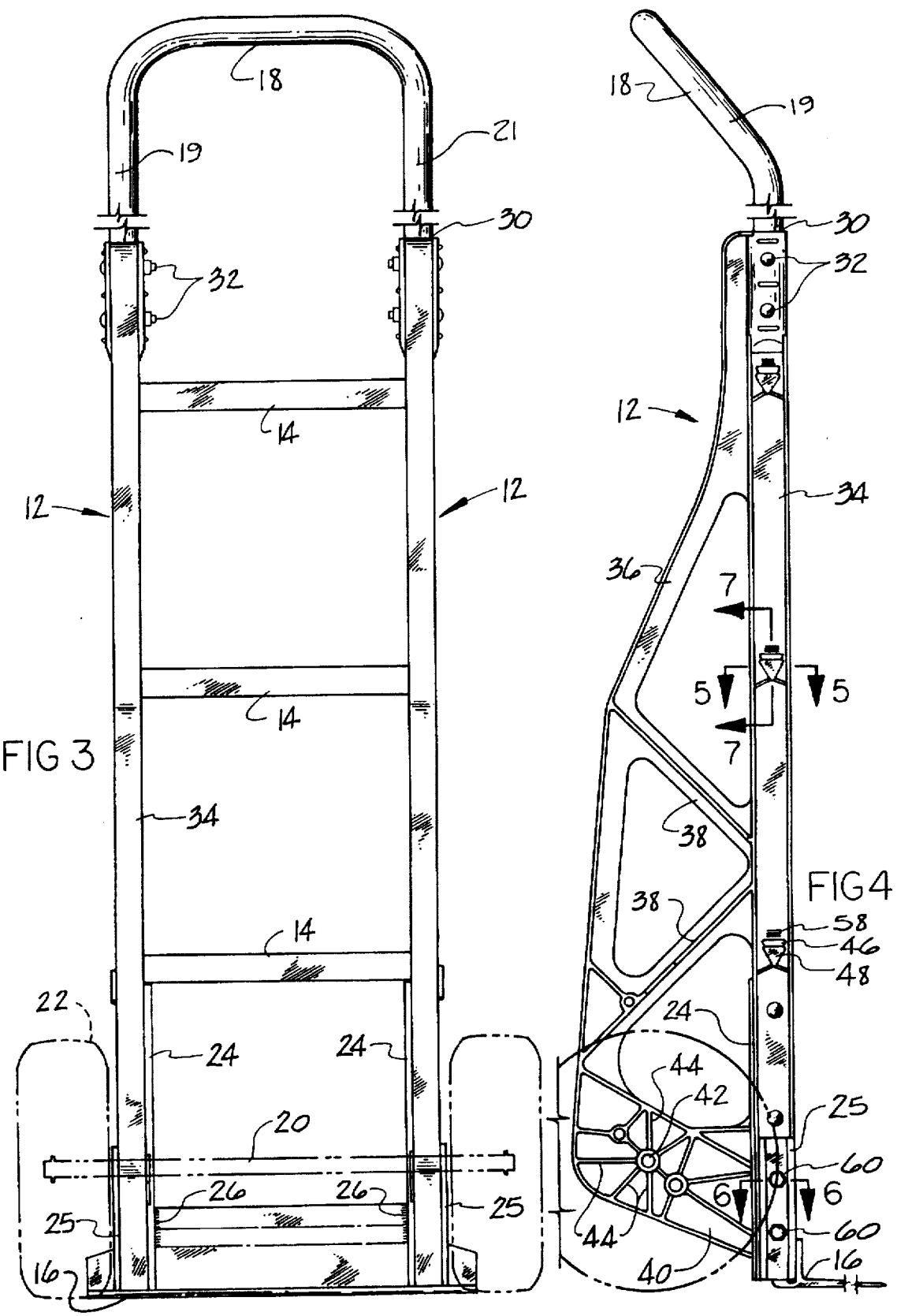

COMPOSITE HAND TRUCK

BACKGROUND OF THE INVENTION

FIELD OF INVENTION

This invention relates to two-wheel hand trucks of the industrial type wherein a pair of side frames joined by cross rails along their length and a toe plate for supporting and lifting the load at the lower end along with an axle and a pair of wheels with the primary purpose of lifting and transporting objects to be carried.

DESCRIPTION OF THE PRIOR ART

Hand trucks of varying design have been around for the better part of this century as exemplified in applicant's catalog No. 190 published January 1990. The design of hand trucks has varied over the years depending upon a variety of factors such as load capacity and specialized use. In the early days the industrial hand trucks were constructed of heavy hardwood frames with steel nose plates which are used to leverage the load on to the truck and sustain the major stress on the hand truck. Later designs went to all steel welded tubular construction and more recently to aluminum construction with extruded channels for the frames. The usage of plastics on industrial grade hand trucks has for the most part not existed until the present invention.

U.S. Pat. No. 4,563,014 teaches an aluminum constructed hand truck having plastic cross rails for decreased weight while the remainder of the structure, including the side frames, is aluminum. Obviously the cross rails are subject to a minimum of stress while the principal stress area is the toe plate and the side frames of the truck.

There are a variety of non-industrial two-wheel carts which utilize a substantial amount of plastic, such as U.S. Pat. No. 4,869,526, which is a folding golf cart constructed for the most part of plastic. Other light load carts utilize plastic, such as U.S. Pat. No. 4,591,183, which is a personal luggage carrier which teaches a construction of plastic parts and telescoping metal tubes.

U.S. Pat. No. 4,452,468 teaches another two-wheel cart for carrying garden waste and leaves which is constructed of a combination of metal tubes and plastic.

SUMMARY OF THE INVENTION

The hand truck of the present invention includes a side frame construction molded of high strength plastic in the form of an open truss. The cross rails or cross frame members are also plastic while the toe plate or nose, which carries the principal stress on the hand truck, is still fabricated from aluminum or steel. The remainder of the truck design is conventional with a pair of wheels and a steel axle. The hand truck design is strictly industrial with a capacity of 600 pounds. The side frame trusses are positioned in a vertical plane with the depth of the truss decreasing from the wheels upward toward the handle. Any loads on the hand truck which are in the plane of the side frame truss are easily handled and in fact capable of substantially greater loads. The toe plate transfers its substantial moment loads to the trusses through aluminum stiffener members which extend a portion of the length of the truss and overlap the compressive member of the truss.

It is therefore the principal object of the present invention to provide an industrial hand truck utilizing a plastic side frame truss.

Another object of the present invention is to provide a hand truck design of minimal weight.

Another object of the present invention is to provide a hand truck design having improved flexibility over steel trucks while carrying substantial loads.

Other objects and advantages will be apparent in the following detailed description, taken in conjunction with the accompanying drawing.

BRIEF DESCRIPTION OF THE DRAWINGS

FIG. 3 is a front elevational view;

FIG. 4 is a side elevational view, with portions of the toe plate broken away;

DESCRIPTION OF THE PREFERRED EMBODIMENT

Figure 1:
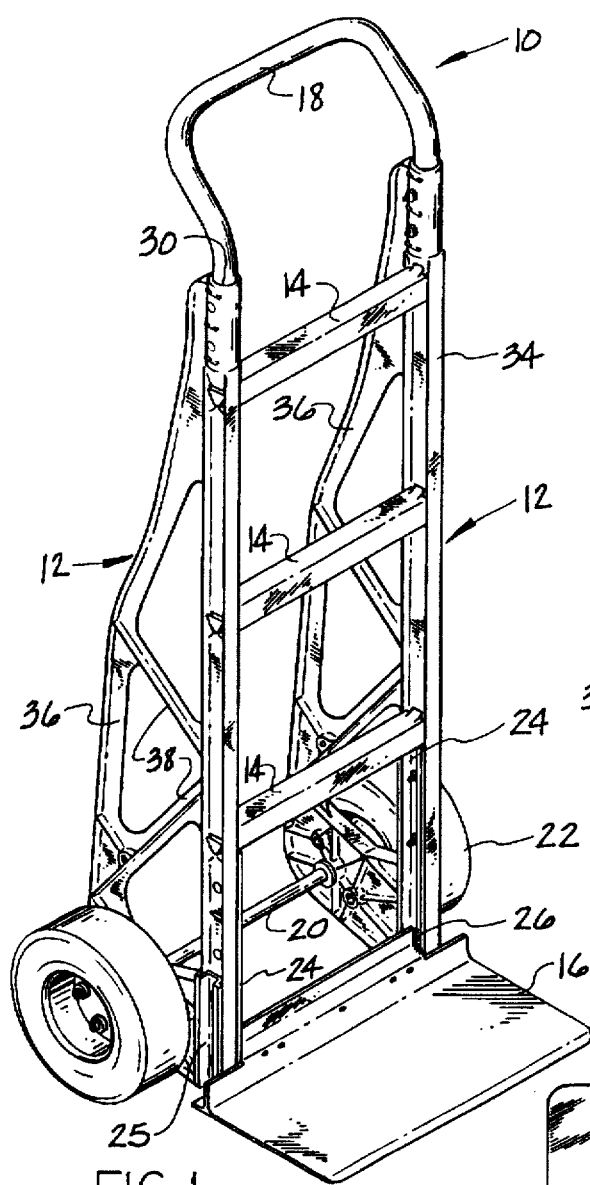
FIG. 1 is a perspective view of the preferred embodiment of the composite side frame hand truck in accordance with the present invention.

Turning now to the drawing in which like reference numerals indicate corresponding elements throughout all of the views, attention is first directed to FIG. 1 which generally illustrates the hand truck of the present invention by reference numeral 10. The truck 10 comprises a pair of side frames 12 which are joined by three cross rails 14 along their length. Joining the lower ends of side frames 12 is the toe plate 16 which has a pair of channel shaped stiffeners 24 welded thereto for attachment to the side frame truss 12. Passing through the lower ends of the side frames is an axle 20 which supports conventional wheels 22. Molded at the upper end of truss 12 is a socket 30 for receipt of handle 18. Handle 18 is a "U" shaped piece of tubing having two parallel hand gripping extensions 19 and 21 which are engaged in sockets 30 of the left and right side frames 12 seen in FIG. 3. Extensions 19 and 21 are held in place by bolts 32 and maintain the upper ends of the side frame trusses 12 in a rigid relationship preventing any relative movement between the side frame trusses.

The side frame truss 12, as seen in all of the figures, is molded in a high strength plastic such as glass-filled Nylon, a registered trademark, as best seen in FIG. 4. Long fiber glass filled nylon has a tensile strength of 30,500 psi while chopped fiber glass filled nylon has a tensile strength of 25,500 psi. Other plastics such as polyethylene have a tensile strength in a range of 2,500 psi to 4,500 psi would be considered low strength plastics.

Figure 5:
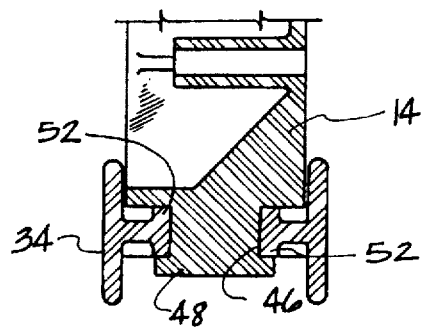
FIG. 5 is a sectional view to an enlarged scale taken along lines 5—5 of FIG. 4.
Figure 7:
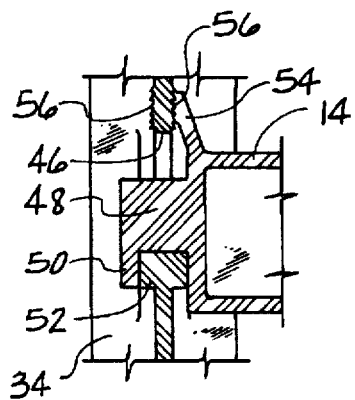
FIG. 7 is a sectional view to an enlarged scale taken along lines 7—7 of FIG. 4.
Figure 2:
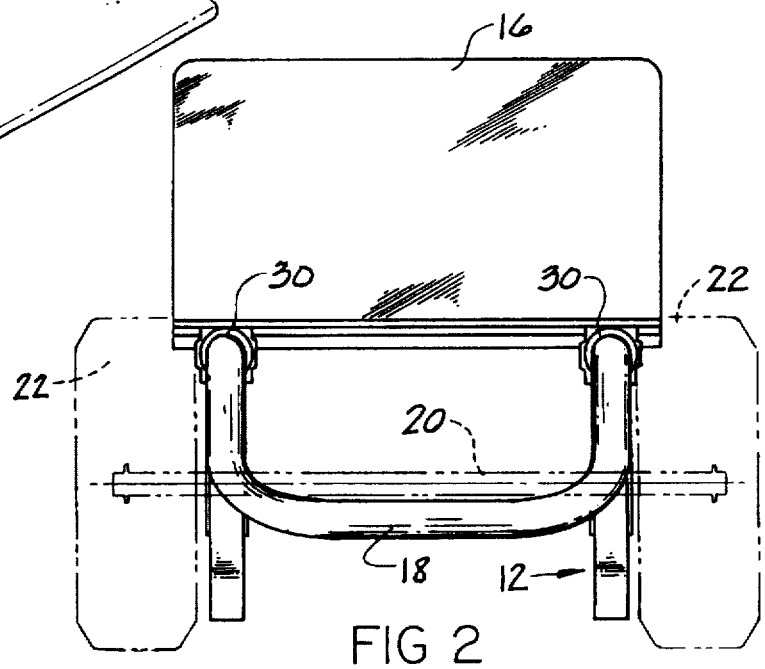
FIG. 2 is a top view of the hand truck, with the wheels and axle shown in dotted line.

Compression and tensile stresses are interchangeable depending upon the truck's use, whether it be breakout stress or transport stress. The following description is referring to the transport condition. The truss includes a plurality of members including a compressive member 34 having an I-beam cross-section and a tensile member 36 on the bottom of the truss. Spaced along the length of the truss are a pair of diagonally spaced members 38 and a relatively heavy base member 40. Base member 40 carries the full load on the truss through axle journal 42 and that load is spread through base member 40 of the truss by a series of radial webs 44. Tensile member 36 on the truss is T-shaped in cross-section while diagonal members 38 have an X cross-section. Cross rails 14 are joined to the web of truss member 34 by a locking joint structure shown in detail in FIGS. 5 and 7. Truss member 34, as best seen in FIG. 4, has a triangular shaped opening 46 therein which receives a triangular shaped post 48 formed on the end of cross rail 14. Post 48 has a hook shape which can be seen in cross-section in FIG. 7 so that once it passes through hole 46, it can be slid downward so that hook 50 on the post 48 engages the extending rib 52 and provides a snug joint between the cross rail 14 and the side frame truss 12. As shown in FIG. 7, arm 54 with serrated teeth 56 on its outer surface engages a similar set of serrated teeth 58 on member 34 to retain the cross rail 14 in its locked position. To disassemble the side frames 12 from the cross rails 14, arm 54 must be pried away from the engaging teeth 56 and then slid upward, from its FIG. 7 position.

Figure 6:
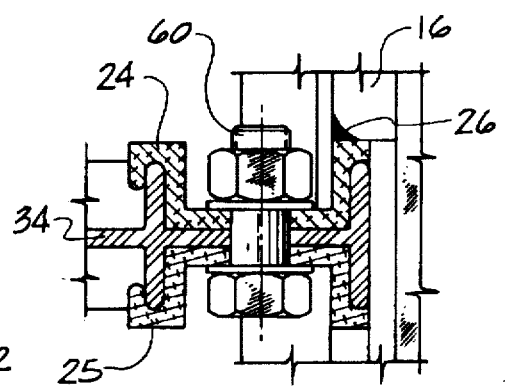
FIG. 6 is a sectional view to an enlarged scale taken along lines 6—6 of FIG. 4.

The toe plate 16 of the hand truck which is formed of aluminum carries the heaviest bending stress on any part of the hand truck. To spread this bending load on the side frame trusses 12, a pair of stiffener members 24 and 25, as best seen in FIG. 6, are used to surround truss member 34 therebetween. Inner stiffener member 24 is welded to toe plate 16 by weld 26. A pair of bolts 60 clamp the two stiffeners 24 and 25 around truss member 34, thereby stiffening member 34 along two axes. The tensile member 36 of the truss 12 as seen in FIGS. 1 and 4 also functions as a stair glide to ease loads up and down stairs and over curbs.

It is to be understood that the drawings and the descriptive matter are in all cases to be interpreted as merely illustrative of the principals of the invention, rather than as limiting the same in any way since it is contemplated that the various changes may be made in various elements to achieve like results without departing from the spirit of the invention or the scope of the appended claims.

I claim:

1. In a two-wheeled, industrial hand truck which comprises a pair of side frames having handles at their upper ends, the side frames being joined by cross rails along their length and a toe plate for supporting the load joining the lower ends of the side frames, an axle and a pair of wheels also attached to said lower ends, the improvement comprising:

said side frames of the truck each constructed of molded plastic in a single piece formed in an open truss having compressive and tensile members, separated by diagonal members, the truss lying in a vertical plane normal to the axle of the truck.

2. In a two-wheeled hand truck, as set forth in claim 1, wherein the truss members of the side frame include webs of differing depth depending on the load the member is subjected to.

3. In a two-wheeled hand truck, as set forth in claim 1, wherein the compressive members of the side frame truss having an I-beam cross section, the toe plate which is constructed of metal includes a channel shaped stiffener shaped to overlie the I-beam cross section of the compressive member and distribute the load to the truss longitudinally along the length of the stiffener.

4. In a two-wheeled hand truck, as set forth in claim 1, wherein the tensile member of the side frame truss includes a web on the inboard side.

5. In a two-wheeled hand truck, as set forth in claim 1, wherein the lower ends of the trusses include an axle journal with webs extending radially therefrom.

6. In a two-wheeled hand truck, as set forth in claim 1, wherein one of the tensile members of the side frame is adjacent one of said wheels and functions as a stair guide.

7. A two-wheel hand truck comprising:

a pair of longitudinal side frames having upper and lower ends molded of plastic in the form of an open truss lying in a vertical plane;

handles connected to the upper ends of the side frames;

cross rails joining the side frames along their length;

a toe plate joining the lower ends of the side frames along with an axle supporting a pair of wheels.

8. In a two-wheeled hand truck, as set forth in claim 7, including channel shaped stiffeners which are integral with said toe plate, surrounding portions of the lower ends of said side frames.

\* \* \* \* \*

US005749588B1

REEXAMINATION CERTIFICATE (4210th)

United States Patent [19]

Stallbaumer

[11] B1 5,749,588
[45] Certificate Issued Nov. 21, 2000

[54] COMPOSITE HAND TRUCK

[75] Inventor: John J. Stallbaumer, Wichita, Kans.

[73] Assignee: Harper Trucks, Inc., Wichita, Kans.

Reexamination Request:
No. 90/005,194, Dec. 16, 1998

Reexamination Certificate for:
Patent No.: 5,749,588
Issued: May 12, 1998
Appl. No.: 08/681,825
Filed: Jul. 29, 1996

[51] Int. Cl.$^7$ .................................................. B62B 1/02
[52] U.S. Cl. ................................. 280/47.27; 280/47.17; 280/47.24
[58] Field of Search ........................ D8/359; D34/24, D34/26, 28; 137/355.12; 242/407.1, 407; 280/47.29, 47.17, 47.24, 47.31, 47.26, 655, 655.1, 653, 652, 47.27

[56] References Cited

U.S. PATENT DOCUMENTS

| | | | |
|---|---|---|---|
| Re. 32,510 | 9/1987 | Tisbo | 137/355.2 |
| D. 273,338 | 4/1984 | Walton | D34/43 |
| D. 303,446 | 9/1989 | Kitts et al. | D34/26 |
| D. 317,219 | 5/1991 | Rehrig | D34/27 |
| D. 323,228 | 1/1992 | Spear et al. | D34/24 |
| D. 326,549 | 5/1992 | Whitehead et al. | D34/26 |
| D. 352,149 | 11/1994 | Nelson et al. | D34/26 |
| D. 377,255 | 1/1997 | Rehrig | D34/27 |
| D. 384,467 | 9/1997 | Stallbaumer | D34/27 |
| D. 395,105 | 6/1998 | Stallbaumer | D34/12 |
| 530,991 | 12/1894 | Grieb . | |
| 1,192,790 | 7/1916 | Knapp . | |
| 2,263,879 | 11/1941 | Jorgensen | 280/5.24 |
| 2,922,658 | 1/1960 | Manahan | 280/47.29 |
| 3,046,035 | 7/1962 | Nichols | 280/47.27 |
| 3,783,563 | 1/1974 | Moore | 52/11 |
| 3,927,898 | 12/1975 | Weyrauch | 280/47.27 |
| 4,452,468 | 6/1984 | Eads et al. . | |
| 4,512,361 | 4/1985 | Tisbo et al. | 137/355.27 |
| 4,540,196 | 9/1985 | Paping et al. | 280/6.52 |
| 4,563,014 | 1/1986 | Mortensen | 280/47.18 |
| 4,591,183 | 5/1986 | Gordon et al. . | |
| 4,679,817 | 7/1987 | Schufer | 280/47.27 |
| 4,777,774 | 10/1988 | Smalley, III | 52/282 |
| 4,777,976 | 10/1988 | Johnson et al. | 137/355.27 |
| 4,869,526 | 9/1989 | Blake | 280/47.27 |
| 5,007,598 | 4/1991 | Spear et al. | 242/86.2 |
| 5,040,808 | 8/1991 | McIntyre | 280/47.26 |
| 5,056,553 | 10/1991 | Whitehead et al. | 137/355.27 |
| 5,308,011 | 5/1994 | Roman | 242/86 |
| 5,381,981 | 1/1995 | Nelson | 242/407.1 |
| 5,425,391 | 6/1995 | Tisbo et al. | 137/15 |
| 5,533,742 | 7/1996 | Peart | 280/281.1 |

FOREIGN PATENT DOCUMENTS

| | | | |
|---|---|---|---|
| 998054 | 1/1952 | France | 280/47.27 |
| 655696 | 5/1986 | Sweden | 280/47.17 |

OTHER PUBLICATIONS

Harper catalogue on Hand Trucks No. 190, pp. 14, 20, & 33 published Jan. 1990 by Harper Trucks, Inc.
Webster's Third New International Dictionary of the English Language unabridged, Copyright 1971, p. 2456 as to "Truss".
Harper (catalogue) No. 190, 1990 (52 pages) (no date).
Expresso (catalogue) No. 3202—5 pages (no date).

*Primary Examiner*—Eric Culbreth

[57] ABSTRACT

A two-wheeled hand truck comprising a pair of side frames molded from highstrength plastic formed in an open truss with compression and tensile members. The side frames are held in a rigid parallel relationship to each other by cross rails, handles and a toe plate with integral stiffeners attached to the side frames.

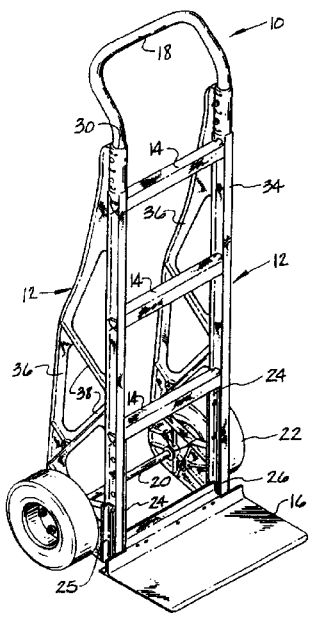

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 47–54:

The side frame truss 12, as seen in all of the figures, is molded in a high strength plastic such as glass-filled Nylon, a registered trademark, as best seen in FIG. 4. [Long fiber glass filled nylon has a tensile strength of 30,500 psi while chopped fiber glass filled nylon has a tensile strength of 25,500 psi. Other plastics such as polyethylene have a tensile strength in a range of 2,500 psi to 4,500 psi would be considered low strength plastics.]

AS A RESULT OF REEXAMINATION, IT HAS BEEN DETERMINED THAT:

Claims 1–8 are determined to be patentable as amended.

New claims 9–19 are added and determined to be patentable.

1. [In a] *A* two-wheeled, industrial hand truck which comprises a pair of side frames having handles at their upper ends, the side frames being joined by cross rails along [their] *the* length *of the side frames* and a toe plate for supporting [the] *a lifted* load *said toe plate* joining the lower ends of [the] *said* side frames, an axle and a pair of wheels also attached to said lower ends, [the improvement comprising:]
    said side frames [of the truck] each constructed of molded plastic in a single piece formed in an open truss having compressive and tensile members, separated by diagonal members, *said members exhibiting a combination of X, T and I shaped cross-sections,* the truss lying in a vertical plane normal to the axle of the truck.

2. [In a] *A* two-wheeled hand truck, as set forth in claim 1, wherein the truss members of the side frame include webs of differing depth depending on the load the member is subjected to.

3. [In a] *A* two-wheeled hand truck, as set forth in claim 1, wherein *one of* the compressive *and tensile* members of the side frame truss [having] *has* an I-beam cross section, *and* the toe plate [which] is constructed of metal [includes a channel shaped stiffener shaped to overlie the I-beam cross section of the compressive member] and [distribute] *distributes* the load to the [truss] *side frames* longitudinally along the length of [the stiffener] *one of the compressive and tensile members.*

4. [In a] *A* two-wheeled hand truck, as set forth in claim 1, wherein the tensile member of the side frame truss includes a web on the inboard side.

5. [In a] *A* two-wheeled hand truck, as set forth in claim 1, wherein the lower ends of the truss include an axle journal with webs extending radially therefrom.

6. [In a] *A* two-wheeled hand truck, as set forth in claim 1, wherein one of the tensile members of the side frame is adjacent one of said wheels and functions as a stair guide.

7. A [two-wheel] *two-wheeled* hand truck comprising:
    a pair of longitudinal side frames having upper and lower ends molded of plastic in the form of [an] *a single piece, load bearing* open truss lying in a vertical plane;
    *said open truss formed from top, bottom and cross members having a combination of X, T and I shaped cross-sections,*
    handles connected to the upper ends of the side frames;
    cross rails joining the side frames along their length;
    a toe plate joining the lower ends of the side frames along with an axle supporting a pair of wheels.

8. [In a] *A* two-wheeled hand truck, as set forth in claim 7, *further* including *load spreading* channel shaped stiffeners which are integral with said toe plate, surrounding portions of the lower ends of said side frames *to transmit bending load onto said truss.*

9. *A two-wheeled hand truck, as set forth in claim 8, wherein the bending load is transmitted to a compressive member in each side frame.*

10. *A two-wheeled hand truck, as set forth in claim 7, wherein said cross rails are removable and snap into place by mating sets of serrated teeth on the cross rails and side frames, respectively.*

11. *A two-wheeled hand truck as in claim 7, wherein the top member has an I-shaped cross-section.*

12. *A two-wheeled hand truck, as set forth in claim 1, wherein said side frames are joined together by removable cross rails.*

13. *A two-wheeled hand truck, as set forth in claim 12 wherein removable cross rails snap into place by meeting sets of serrated teeth on the cross rails and said side frame, respectively.*

14. *A two-wheeled hand truck, as set forth in claim 1, further including a plurality of radial webs in said side frame surrounding said axle.*

15. *A two-wheeled hand truck, as set forth in claim 14 wherein said plurality of radial webs are located on each side of said side frames.*

16. *A two-wheeled hand truck, as set forth in claim 1, wherein said hand truck can be disassembled.*

17. *A two-wheeled hand truck, as set forth in claim 1 wherein the plastic is a reinforced plastic.*

18. *A two-wheeled hand truck as in claim 1, wherein said diagonal members extend across said open truss.*

19. *A two-wheeled hand truck as in claim 1, wherein one of said compressive and tensile members has an I-beam cross-sectional shape.*

* * * * *